(12) United States Patent
Hanke et al.

(10) Patent No.: US 9,539,498 B1
(45) Date of Patent: Jan. 10, 2017

(54) MAPPING REAL WORLD ACTIONS TO A VIRTUAL WORLD ASSOCIATED WITH A LOCATION-BASED GAME

(71) Applicant: Niantic, Inc., San Francisco, CA (US)

(72) Inventors: John V. Hanke, Piedmont, CA (US); Mark A. Aubin, Sunnyvale, CA (US); James Dinkelacker, Lahaina, HI (US); Phillip Craig Keslin, San Jose, CA (US); Charles Spirakis, Los Altos, CA (US)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 13/955,600

(22) Filed: Jul. 31, 2013

Related U.S. Application Data

(60) Provisional application No. 61/677,836, filed on Jul. 31, 2012.

(51) Int. Cl.
*A63F 13/00* (2014.01)
*A63F 13/217* (2014.01)

(52) U.S. Cl.
CPC ............. *A63F 13/00* (2013.01); *A63F 13/217* (2014.09)

(58) Field of Classification Search
CPC  A63F 13/12; A63F 2300/5573; A63F 17/217; A63F 13/217; G07F 17/3272
USPC .......................................................... 463/42
See application file for complete search history.

(56) References Cited

U.S. PATENT DOCUMENTS

| | | | |
|---|---|---|---|
| 6,530,841 B2 | 3/2003 | Bull et al. | |
| 6,811,084 B2 | 11/2004 | Tatsuta et al. | |
| 7,275,994 B2 | 10/2007 | Eck et al. | |
| 7,435,179 B1 | 10/2008 | Ford | |
| 7,491,123 B2 | 2/2009 | Smith | |
| 7,564,469 B2 | 7/2009 | Cohen | |

(Continued)

FOREIGN PATENT DOCUMENTS

| | | |
|---|---|---|
| EP | 1574238 | 9/2005 |
| EP | 2101889 | 9/2009 |

(Continued)

OTHER PUBLICATIONS

Matyas, "Playful Geospatial Data Acquisition by Location-Based Gaming Communities", The International Journal of Virtual Reality, 2007, vol. 6, No. 3, pp. 1-10, Mar. 2007.

(Continued)

*Primary Examiner* — Jason Skaarup
*Assistant Examiner* — Ryan Hsu
(74) *Attorney, Agent, or Firm* — Fenwick & West LLP

(57) ABSTRACT

Computer-implemented methods and systems for mapping real world actions to a virtual world associated with a parallel reality game are provided. The virtual world has experiences that relate to real world actions. The method includes accessing a data source associated with one or more real world actions; and modifying game data associated with the parallel reality game to generate experiences in the virtual world based at least in part on the data associated with the one or more real world actions. Generating experiences in the virtual world based on data associated with real world actions improves the link between the parallel virtual world and the real world, enhancing illusion that the virtual world is another dimension of the real world that the player can interact with through the parallel reality game.

8 Claims, 4 Drawing Sheets

(56) References Cited

U.S. PATENT DOCUMENTS

| | | | |
|---|---|---|---|
| 7,843,471 B2* | 11/2010 | Doan | A63F 1/04 345/418 |
| 7,946,919 B2 | 5/2011 | Piccionelli | |
| 7,970,749 B2 | 6/2011 | Uhlir et al. | |
| 8,002,617 B1 | 8/2011 | Uskela et al. | |
| 8,070,608 B2* | 12/2011 | Uhlir et al. | 463/42 |
| 8,108,459 B1 | 1/2012 | Hoffman et al. | |
| 8,190,733 B1 | 5/2012 | Hoffman et al. | |
| 8,267,794 B2 | 9/2012 | Van Luchene | |
| 8,287,383 B1 | 10/2012 | Etter et al. | |
| 8,291,016 B1 | 10/2012 | Whitney et al. | |
| 8,308,568 B2 | 11/2012 | Amaitis et al. | |
| 8,366,446 B2 | 2/2013 | Kreiner et al. | |
| 2001/0009867 A1 | 7/2001 | Sakaguchi et al. | |
| 2002/0090985 A1* | 7/2002 | Tochner et al. | 463/1 |
| 2003/0036428 A1 | 2/2003 | Aasland | |
| 2003/0224855 A1 | 12/2003 | Cunningham | |
| 2004/0029625 A1 | 2/2004 | Annunziata | |
| 2004/0058732 A1 | 3/2004 | Piccionelli | |
| 2004/0255268 A1 | 12/2004 | Meijer et al. | |
| 2005/0049022 A1 | 3/2005 | Mullen | |
| 2006/0105838 A1 | 5/2006 | Mullen | |
| 2006/0258420 A1 | 11/2006 | Mullen | |
| 2006/0270421 A1* | 11/2006 | Phillips et al. | 455/457 |
| 2006/0281553 A1* | 12/2006 | Hawkins et al. | 463/42 |
| 2006/0284789 A1 | 12/2006 | Mullen | |
| 2006/0287026 A1 | 12/2006 | Mullen | |
| 2007/0021166 A1 | 1/2007 | Mattila | |
| 2007/0060408 A1 | 3/2007 | Schultz et al. | |
| 2007/0104348 A1 | 5/2007 | Cohen | |
| 2007/0149284 A1* | 6/2007 | Plavetich et al. | 463/37 |
| 2007/0281765 A1 | 12/2007 | Mullen | |
| 2007/0281766 A1 | 12/2007 | Mullen | |
| 2008/0015018 A1 | 1/2008 | Mullen | |
| 2008/0015024 A1 | 1/2008 | Mullen | |
| 2008/0146338 A1* | 6/2008 | Bernard et al. | 463/42 |
| 2009/0005140 A1* | 1/2009 | Rose et al. | 463/7 |
| 2009/0017913 A1* | 1/2009 | Bell et al. | 463/40 |
| 2009/0024986 A1 | 1/2009 | Meijer et al. | |
| 2009/0281851 A1 | 11/2009 | Newton et al. | |
| 2010/0287011 A1 | 11/2010 | Muchkaev | |
| 2010/0331089 A1 | 12/2010 | Priebatsch et al. | |
| 2011/0004658 A1 | 1/2011 | Chesley et al. | |
| 2011/0081973 A1* | 4/2011 | Hall | 463/42 |
| 2011/0319148 A1 | 12/2011 | Kinnebrew et al. | |
| 2012/0040745 A1 | 2/2012 | Auterio et al. | |
| 2012/0052953 A1 | 3/2012 | Annambhotla et al. | |
| 2012/0094770 A1 | 4/2012 | Hall | |
| 2012/0157210 A1 | 6/2012 | Hall | |
| 2012/0185892 A1 | 7/2012 | Camplejohn et al. | |
| 2012/0190452 A1* | 7/2012 | Weston et al. | 463/39 |
| 2012/0226627 A1 | 9/2012 | Yang | |
| 2012/0231887 A1 | 9/2012 | Lee et al. | |
| 2012/0233258 A1 | 9/2012 | Vijayaraghavan et al. | |
| 2012/0244945 A1* | 9/2012 | Kolo | A63F 13/12 463/42 |
| 2012/0246104 A1 | 9/2012 | Di Sciullo et al. | |
| 2012/0315992 A1 | 12/2012 | Gerson et al. | |
| 2013/0004932 A1 | 1/2013 | Mahajan et al. | |
| 2013/0005475 A1* | 1/2013 | Mahajan et al. | 463/42 |
| 2013/0005480 A1* | 1/2013 | Bethke et al. | 463/42 |
| 2013/0072308 A1 | 3/2013 | Peck et al. | |
| 2013/0117326 A1 | 5/2013 | De Smet et al. | |
| 2013/0178257 A1 | 7/2013 | Langseth | |

FOREIGN PATENT DOCUMENTS

| | | |
|---|---|---|
| EP | 2393056 | 12/2011 |
| EP | 2416289 | 2/2012 |
| WO | WO 02/062436 | 8/2002 |

OTHER PUBLICATIONS http://klout.com/corp/klout_score—4 pages, Apr. 2013.
www.empireavenue.com/about/—1 page, Mar. 2012.

* cited by examiner

MAPPING REAL WORLD ACTIONS TO A VIRTUAL WORLD ASSOCIATED WITH A LOCATION-BASED GAME

PRIORITY CLAIM

The present application claims the benefit of priority of U.S. Provisional Patent Application Ser. No. 61/677,836, titled Mapping Real World Actions to a Virtual World Associated with a Location-Based Game, filed Jul. 31, 2012, which is incorporated herein by reference.

FIELD

The present disclosure relates generally to location-based gaming, and more particularly, to a system and method for mapping real world elements to a virtual world associated with a location-based game.

BACKGROUND

Computer-based and/or electronic gaming systems are known that provide a shared virtual environment for many players to interact in a virtual world. With increased availability and connectivity to the Internet, many players from all over the world can interact in the virtual environment and perform various game objectives. Such gaming systems typically do not have a virtual world geography that parallels the real world. Location-based games use the real world as their geography. Some location-based games add virtual locations on a map that parallels the real world geography. Such games, however, are typically focused on real world objectives. These games typically do not include a virtual world that parallels the real world and that acts as a virtual game environment in which many players can interact and perform various game objectives in the parallel virtual world by navigating and performing actions in the real world.

A parallel reality game providing a shared virtual world that parallels at least a portion of the real world allows players to interact in the virtual world by navigating the real world. However, when actions in the real world are not suitably tied to the virtual world, controlling the parallel reality game by navigating the real world can feel contrived, discouraging game play.

SUMMARY

Aspects and advantages of the invention will be set forth in part in the following description, or may be obvious from the description, or may be learned through practice of the invention.

One exemplary aspect of the present disclosure is directed to a computer-implemented method of mapping real world actions to a virtual world associated with a parallel reality game. The virtual world has experiences that relate to real world actions. The method includes accessing a data source associated with one or more real world actions; and modifying game data associated with the parallel reality game to generate experiences in the virtual world based at least in part on the data associated with the one or more real world actions.

Other exemplary implementations of the present disclosure are directed to systems, apparatus, non-transitory computer-readable media, devices, and user interfaces for mapping real world actions to a virtual world associated with a parallel reality game.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
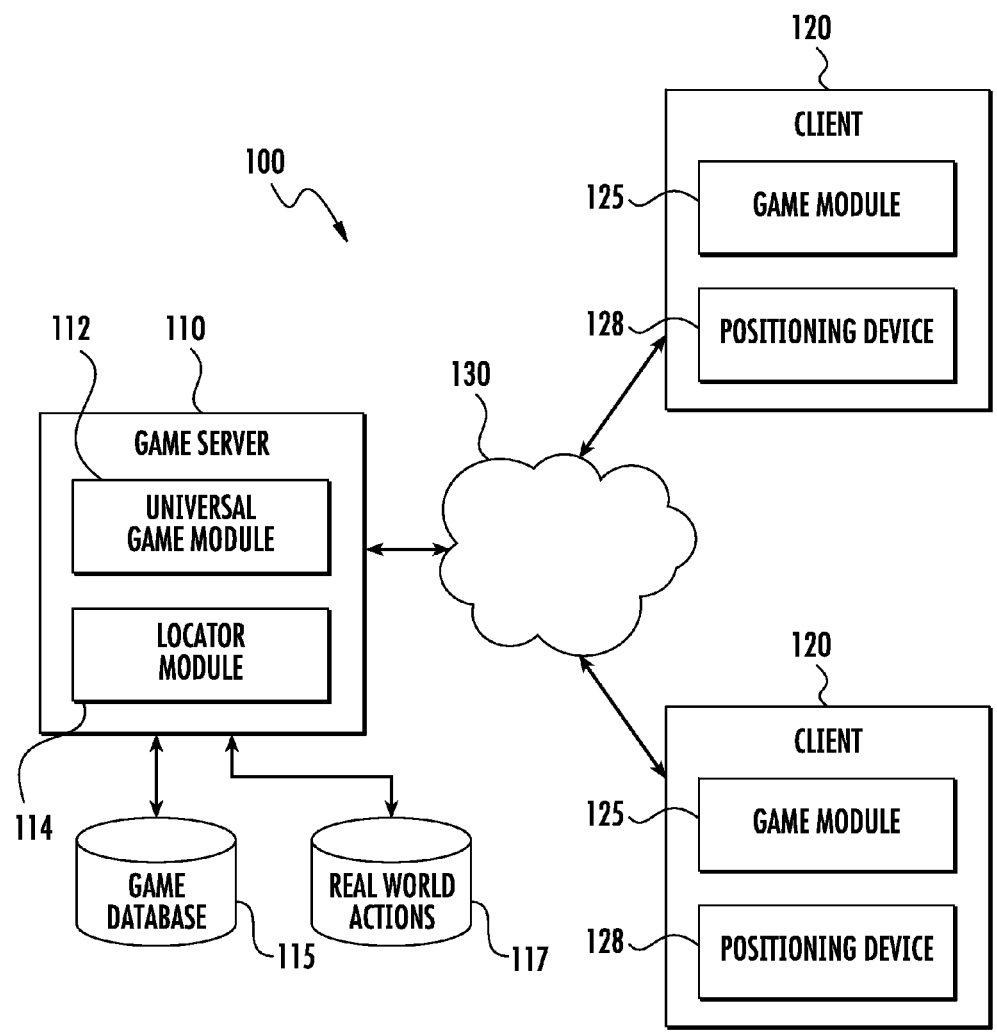
FIG. 1 depicts an exemplary computer-based system for implementing a location-based game according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to a computer-implemented method and system for mapping real world actions to a virtual world associated with a parallel reality game. The virtual world has experiences that relate to real world actions, such experiences incorporating virtual elements, such as virtual objects, virtual items, virtual energy, and other virtual elements, that can be used or collected by players of a parallel reality game having a virtual world that parallels at least a portion of the real world. In particular, the experiences in the virtual world are determined based on data associated with one or more real world actions. In this way, virtual experiences can correspond to actions in the real world that make game play more immersive. Moreover, locating virtual experiences in the virtual world based on data associated with real world actions improves the link between the parallel virtual world and the real world, further enhancing the illusion that the virtual world is another dimension of the real world that the player can perceive and interact with through the parallel reality game.

A game server can host a location-based parallel reality game having a player gaming area that includes a virtual environment with a geography that parallels at least a portion of the real world geography. Players can navigate a virtual space in the virtual world by navigating a corresponding geographic space in the real world. In particular, players can navigate a range of coordinates defining a virtual space in the virtual world by navigating a range of geographic coordinates in the real world.

In one aspect, the positions of players can be monitored or tracked using, for instance, a positioning system (e.g. a GPS system) associated with a player's mobile computing device (e.g. cell phone, smartphone, gaming device, or other device). As players move about in the real world, player position information can be provided to the game server hosting the parallel reality game over a network. The game server can update player positions in the parallel virtual world to correspond with the player positions in the real world.

The parallel reality game can include one or more virtual elements that players can interact with during the course of the parallel reality game. To interact with virtual elements, a player may have to travel to the corresponding location of the virtual element in the real world and perform any necessary interactions in the parallel reality game. According to aspects of the present disclosure, virtual experiences can be generated in the virtual world based on data associated with real world actions. The data associated with real world actions can be analyzed to determine experiences in the virtual worlds. For instance, actions in the real world can result in experiences in the virtual world that result from the real world actions.

According to a particular aspect of the present disclosure, a game server can access data associated with one or more real world actions, analyze the data, and adjust game data associated with the parallel reality game to locate virtual experiences based on the data associated with the one or more real world actions. Exemplary data associated with real world actions can include the locations of people and/or players in the real world, including the aggregate locations of such people and/or players, local data associated with items of cultural, recreational, or commercial value, map data, hazard data, weather data, event calendar data, and other suitable data.

Tying virtual experiences to real world actions permits a more engaging experience for players. In this manner, the subject matter of the present disclosure can have a technical effect of providing for an improved computer-based implementation of a parallel reality game that provides for the generation of virtual experiences in a parallel reality game in a manner that improves the link between the real world and the parallel virtual world.

In one embodiment, a game server associated with a parallel reality game can access data associated with the location of individuals in the real world. The data associated with the location of individuals in the real world can be obtained or derived from any suitable source. The data associated with the location of individuals in the real world can include the locations of mobile device users in the real world. In particular, users of mobile devices, such as smart phones, can optionally provide position information, in terms of geographic location in the real world, in order to enhance certain location-based features or other functionality. Any information optionally provided by mobile device users can be provided on conditions of anonymity to protect the privacy of the user optionally providing the position information.

Data associated with the locations of individuals in the real world can also include data associated with the locations of players of the parallel reality game. In particular, the game server can receive position information from each of the plurality of players during play of the parallel reality game such that the game server can update the position of the player in the parallel virtual world associated with the parallel reality game.

The game server can analyze the data associated with the locations of individuals in the real world and generate a virtual experience based on such data. For instance, the game server can locate virtual elements in the virtual world for a user that are collected when that user (or another different user) travels to a particular location in the real world. In certain aspects, the virtual elements can be used to enhance an experience in the real world. For example, virtual elements can be exchanged or presented for one or more goods or services in the real world. Generation of virtual experiences in a virtual world based on real world actions can give players a reason to travel to a particular location in the real world.

In a particular implementation, certain real world actions can be directly and/or indirectly mapped to experiences in the virtual world. For instance, weather data from the real world can have a direct mapping to virtual weather in the virtual world. Similarly, weather data in the real world can be indirectly mapped to the virtual world, such as by causing certain virtual elements to be more challenging to locate when weather conditions in the real world indicate rain. As described herein, such mapping can include any real world action and can directly and/or indirectly map to one or more experiences in the virtual world, regardless of whether such experience is related to the real world action. As another example, a solar eclipse in the real world could indirectly map to the virtual world and result in a virtual experience in which virtual energy is increased for all players in the virtual world. Alternatively, or in combination with the aforementioned example, the solar eclipse could directly map to the virtual world and cause a virtual solar eclipse that is visible in the virtual world. In this way, the game server can generate virtual experiences in the virtual world from real world actions.

The game server can generate virtual experiences in the parallel virtual world based on other data associated with real world actions. For instance, the game server can create virtual experiences based on real world actions associated with items of cultural, recreational, or commercial value, map data, hazard data, weather data, event calendar data, and other suitable data. As an example, the game server can include virtual experiences in the virtual world based on actions associated with real world items corresponding to locations of public, educational, commercial, or recreational value, such as locations of public artwork, tourist attractions, scenic vistas, libraries, or hiking trails.

Other exemplary applications of data associated with real world actions can include two or more users working together in the real world to achieve one or more goals in the virtual world as a virtual experience. As an example, a prerequisite to a virtual experience in the virtual world can be two or more users assembling at a particular location in the real world. When the two or more users assemble at a particular location in the real world, the game server can generate a virtual experience in the virtual world.

Still other exemplary applications of data associated with real world actions can include a first user and second user that travel to a real world location to exchange virtual elements in a virtual world between one another. The virtual elements could be messages, items, or the like. For instance, a first user can travel to a real world location and leave a virtual element in the virtual world for the second user. The second user can then travel to the location in the real world to collect the virtual element in the virtual world.

According to particular aspects of the present disclosure, two or more actions as described herein can be combined to result in one or more virtual experiences. For instance, two or more virtual elements can be distributed throughout the virtual world and require two or more users to engage in real world actions of visiting one or more real world locations to collect such virtual elements. Once users have collected all of the virtual elements, the game server can provide a virtual experience when the users assemble together at a real world location. In alternative implementations, a user can provide their respective virtual element to a different user that then assembles together with the other users at a real world location.

Exemplary Location-Based Parallel Reality Gaming System

Exemplary computer-implemented location-based gaming systems according to exemplary embodiments of the present disclosure will now be set forth. The present subject matter will be discussed with reference to a parallel reality game. A parallel reality game is a location-based game having a virtual world geography that parallels at least a portion of the real world geography such that player movement and actions in the real world affect actions in the virtual world and vice versa. Those of ordinary skill in the art, using the disclosures provided herein, should understand that the subject matter of the present disclosure is equally applicable to other gaming systems. In addition, the inherent flexibility of computer-based systems allows for a great variety of possible configurations, combinations, and divisions of tasks and functionality between and among the components of the system. For instance, the systems and methods for modifying or verifying game data according to aspects of the present disclosure can be implemented using a single computing device or across multiple computing devices.

FIG. 1 illustrates an exemplary computer-implemented location-based gaming system 100 configured in accordance with an embodiment of the present disclosure. The location-based gaming system 100 provides for the interaction of a plurality of players in a virtual world having a geography that parallels the real world. In particular, a geographic area in the real world can be linked or mapped directly to a corresponding area in the virtual world. A player can move about in the virtual world by moving to various geographic locations in the real world. For instance, the system 100 can track a player's position in the real world and update the player's position in the virtual world based on the player's current position in the real world.

Figure 2:
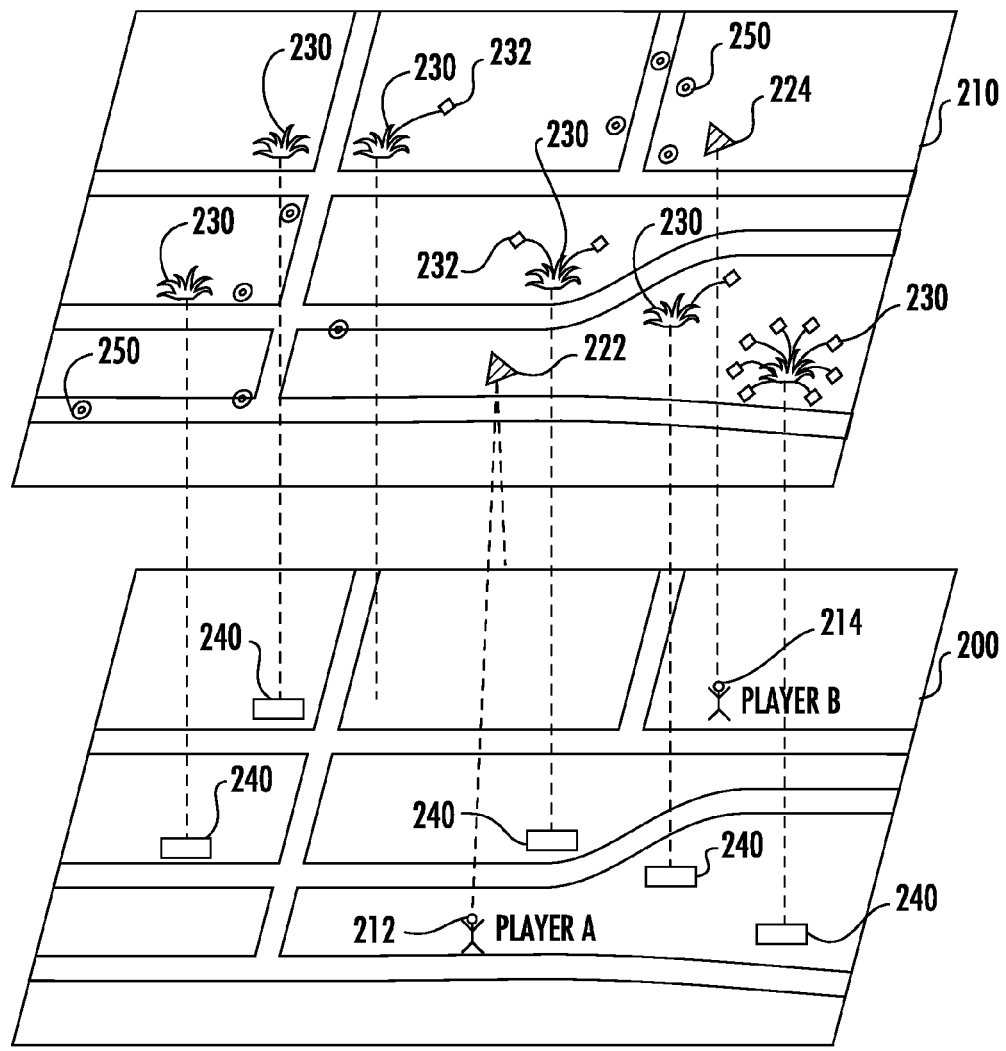
FIG. 2 depicts a representation of a virtual world having a geography that parallels the real world.

FIG. 2 depicts a conceptual diagram of a virtual world 210 that parallels the real world 200 that can act as the game board for all players of a location-based game according to an exemplary embodiment of the present disclosure. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates in the real world 200 is mapped to a corresponding coordinate in a virtual space in the virtual world 210.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system associated with a mobile device carried by the player (e.g. a GPS system) can be used to track a player's position as the player navigates the range of geographic coordinates in the real world 200. Data associated with the player's position in the real world 200 is used to update the player's position in the corresponding range of coordinates defining the virtual space in the virtual world 210. In this manner, players can navigate a continuous track in the range of coordinates defining the virtual space in the virtual world 210 by simply traveling among the corresponding range of geographic coordinates in the real world 200 without necessarily having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, referring to FIG. 2, a game objective can require players to capture or claim ownership of virtual elements 230 located at various virtual locations in the virtual world 210. These virtual elements 230 can be linked to landmarks, geographic locations, or objects 240 in the real world 200. The real world landmarks or objects 240 can be works of art, monuments, buildings, businesses, libraries, museums, or other suitable real world landmarks or objects. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 will have to travel to a landmark 240 in the real world 200 in order to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives can require that players use one or more virtual items that are collected by the players in the location-based game. For instance, the players may have to travel the virtual world seeking virtual items (e.g. weapons or other items) that can be useful for completing game objectives. These virtual items can be found or collected by traveling to different locations in the real world or by completing various actions in either the virtual world or the real world. In the example shown in FIG. 2, a player uses virtual items 232 to capture one or more virtual elements 230. In particular, a player can deploy virtual items 232 at locations in the virtual world 210 proximate the virtual elements 230. Deploying one or more virtual items 232 proximate a virtual element 230 can result in the capture of the virtual element 230 for the particular player or for the team and/or faction of the particular player.

In one particular implementation, a player may have to gather virtual energy as part of the location-based game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the location-based game can be a massive multi-player location-based game where every participant in the game shares the same virtual world. The players can be divided into separate teams or factions and can work together to achieve one or more game objectives, such as to capture or claim ownership of a virtual element. In this manner, the location-based game can intrinsically be a social game that encourages cooperation among players within the game. Players from opposing teams can work against each other during the location-based game. A player can use virtual items to attack or impede progress of players on opposing teams.

The location-based game can have various features to enhance and encourage game play within the location-based game. For instance, players can accumulate a virtual currency or other virtual reward that can be used throughout the game. Players can advance through various levels as the players complete one or more game objectives and gain experience within the game. Players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the location-based game without deviating from the scope of the present disclosure.

Referring back FIG. 1, the computer-implemented location-based gaming system 100 will be discussed in more detail. The system 100 can include a client-server architecture, where a game server 110 communicates with one or more clients 120 over a network 130. Although two clients 120 are illustrated in FIG. 1, any number of clients 120 can be connected to the game server 110 over the network 130. The server 110 can host a universal gaming module 112 that controls aspects of the location-based game for all players and receives and processes each player's input in the location based game. On the client-side, each client 120 can include a gaming module 125 that operates as a gaming application so as to provide a user with an interface to the system 100. The game server 110 transmits game data over the network 130 to the client 120 for use by the gaming module 125 at the client 120 to provide local versions (e.g. portions of the virtual world specific to player locations) of the game to players at locations remote from the game server 110.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

The game server 110 can be any computing device and can include a processor and a memory. The memory can store instructions which cause the processor to perform operations. The game server 110 can include or can be in communication with a game database 115. The game database 115 stores game data used in the location-based game to be served or provided to the client(s) 120 over the network 130.

The game data stored in the game database 115 can include: (1) data associated with the virtual world in the location-based game (e.g. imagery data used to render the virtual world on a display device, geographic coordinates of locations in the virtual world, etc.); (2) data associated with players of the location-based game (e.g. player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the location-based game. The game data stored in the game database 115 can be populated either offline or in real time by system administrators and/or by data received from users/players of the system 100, such as from one or more clients 120 over the network 130.

As will be discussed in further detail below, the game server 110 can include or can also be in communication with a real world action database 117. The real world action database 117 can be a part of, integral with, or separate from the game database 115. The real world action database 117 stores data associated with real world actions, such as such as the individual and/or aggregate locations of players in the real world; actions associated with locations of cultural value or commercial value; map data providing the locations of roads, highways, and waterways; current and past locations of individual players; hazard data, weather data; event calendar data; and other suitable data. The data stored in the real world action database 117 can be collected or obtained from any suitable source. For example, in one aspect, the real world action database 117 can be coupled to, includes, or is part of a map database storing map information, such as one or more map databases accessed by a mapping service. According to another exemplary aspect, the real world action database 117 can obtain or access data associated with past and current locations of players, for instance, from the game database 115. According to yet another exemplary aspect, the real world action database 117 can be coupled to one or more external data sources or services that periodically provide population data, hazard data, weather data, event calendar data, or other data to the real world action database 117.

The game server 110 can be configured to receive requests for game data from one or more clients 120 (for instance, via remote procedure calls (RPCs)) and to respond to those requests via the network 130. For instance, the game server 110 can encode game data in one or more data files and provide the data files to the client 120. In addition, the game server 110 can be configured to receive game data (e.g. player positions, player actions, player input, etc.) from one or more clients 120 via the network 130. For instance, the client device 120 can be configured to periodically send player input, player location, and other updates to the game server 110, which the game server 110 uses to update game data in the game database 115 to reflect any and all changed conditions for the game.

As illustrated, the game server 110 can include a universal game module 112. The universal game module 112 hosts the location-based game for all players and acts as the authoritative source for the current status of the location-based game for all players. The universal game module 112 receives game data from clients 120 (e.g. player input, player position, player actions, player status, landmark information, etc.) and incorporates the game data received into the overall location-based game for all players of the location-based game. The universal game module 112 can also manage the delivery of game data to the clients 120 over the network 130.

According to an exemplary embodiment of the present disclosure, the game server 110 can also include a locator module 114. The locator module 114 can be a part of or separate from the universal game module 112. The locator module 114 can be configured to access data associated with real world actions, analyze the data, and determine virtual experiences in the virtual world based on the data associated with real world actions. For instance, the locator module 114 can modify game data stored in the game database 115 to locate virtual experiences in the virtual world based on the data associated with real world actions.

Other modules can be used with the game server 110. Any number of modules can be programmed or otherwise configured to carry out the server-side functionality described herein. In addition, the various components on the server-side can be rearranged. For instance, the game database 115 can be integrated into the game server 110. Other configurations will be apparent in light of this disclosure and the present disclosure is not intended to be limited to any particular configuration.

A client 120 can be any portable computing device that can be used by a player to interact with the gaming system 100. For instance, a client 120 can be a wireless device, a personal digital assistant (PDA), portable gaming device, cellular phone, smart phone, tablet, navigation system, handheld GPS system or other such device. In short, a client 120 can be any computer-device or system that can execute a gaming module 125 to allow a player to interact with the game system 100.

The client 120 can include a processor and a memory. The memory can store instructions which cause the processor to perform operations. The client 120 can include various input/output devices for providing and receiving information from a player, such as a display screen, touch screen, touch pad, data entry keys, speakers, and/or a microphone suitable for voice recognition. The client 120 can further include a network interface for providing communications over the network 130.

The gaming module 125 executed by the client 120 provides an interface between a player and the location-based game. The gaming module 125 can present a user interface on a display device associated with the client 120 that displays a virtual world associated with the game and allows a user to interact in the virtual world to perform various game objectives. The gaming module 125 can also control various other outputs to allow a player to interact with the game without requiring the player to view a display screen. For instance, the gaming module 125 can control various audio, vibratory, or other notifications that allow the player to play the game without looking at the display screen. The gaming module 125 can access game data received from the game server 110 to provide an accurate representation of the game to the user. The gaming module 125 can receive and process player input and provide updates to the game server 110 over the network 130.

Because the gaming system 100 is for a location-based game, the client 120 is preferably a portable computing device, such as a smartphone or other portable device, that can be easily carried or otherwise transported with a player. A player can interact with the virtual world simply by carrying or transporting the client 120 in the actual world. The client 120 can include a positioning device 128 that monitors the position of a player during game play. The positioning device 128 can be any device or circuitry for monitoring the position of the client 120. For example, the positioning device 128 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

As the player moves around with the client 120 in the real world, the positioning device 128 tracks the position of the player and provides the player position information to the gaming module 125. The gaming module 125 updates the player position in the virtual world based on the actual position of the player in the real world. In particular, the location of the player in the virtual world can correspond to the location of the player in the real world. The gaming module 125 can provide player position information to the game server 110 over the network 130 such that the universal gaming module 112 keeps track of all player positions throughout the game.

The network 130 can be any type of communications network, such as a local area network (e.g. intranet), wide area network (e.g. Internet), or some combination thereof. The network can also include a direct connection between a client 120 and the game server 110. In general, communication between the game server 110 and a client 120 can be carried via a network interface using any type of wired and/or wireless connection, using a variety of communication protocols (e.g. TCP/IP, HTTP, SMTP, FTP), encodings or formats (e.g. HTML, JSON, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 3:
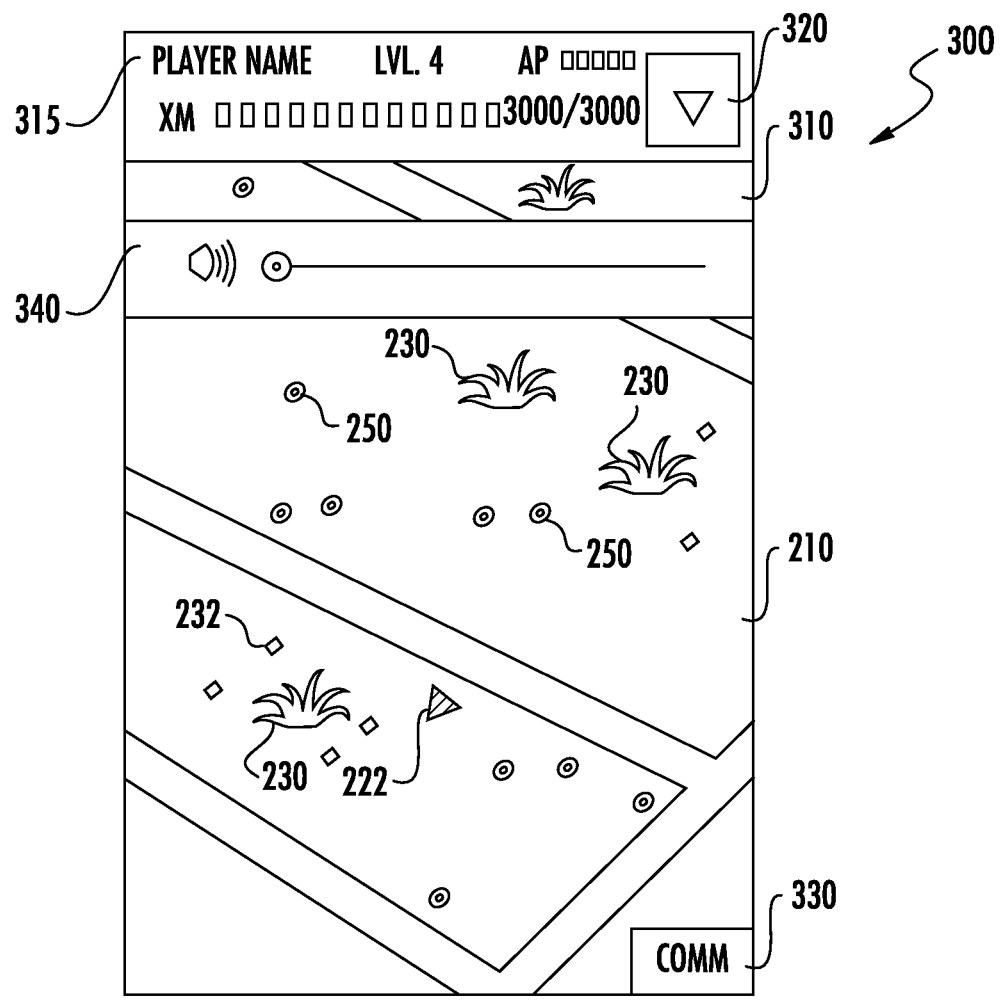
FIG. 3 depicts an exemplary game interface of a location-based game according to an exemplary embodiment of the present disclosure.

FIG. 3 depicts one particular embodiment of a game interface 300 that can be presented on a display of a client 120 as part of the interface between a player and the gaming system 100. The game interface 300 includes a display window 310 that can be used to display the virtual world 210 and various other aspects of the game, such as player position 222 and the locations of virtual elements 230, virtual items 232 and virtual energy 250 in the virtual world 210. The user interface 300 can also display other information, such as game data information, game communications, player information, and other information associated with the game. For example, the user interface can display player information 315, such as player name, experience level and other information. The user interface 300 can include a menu 320 for accessing various game settings and other information associated with the game. The user interface 300 can also include a communications interface 330 that enables communications between the game system and the player and between one or more players of the location-based game.

According to aspects of the present disclosure, a player can interact with the location-based game by simply carrying a client device around in the real world. For instance, a player can play the location-based game by simply accessing an application associated with the location based game on a smartphone and moving about in the real world with the smartphone. In this regard, it is not necessary for the player to continuously view a visual representation of the virtual world on a display screen in order to play the location based game. As a result, the user interface 300 can include a plurality of non-visual elements that allow a user to interact with the game. For instance, the game interface can provide audible notifications to the player when the player is approaching a virtual element or object in the game or when an important event happens in the location-based game. A player can control these audible notifications with audio control 340. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, should understand that numerous game interface configurations and underlying functionalities will be apparent in light of this disclosure. The present disclosure is not intended to be limited to any one particular configuration.

Figure 4:
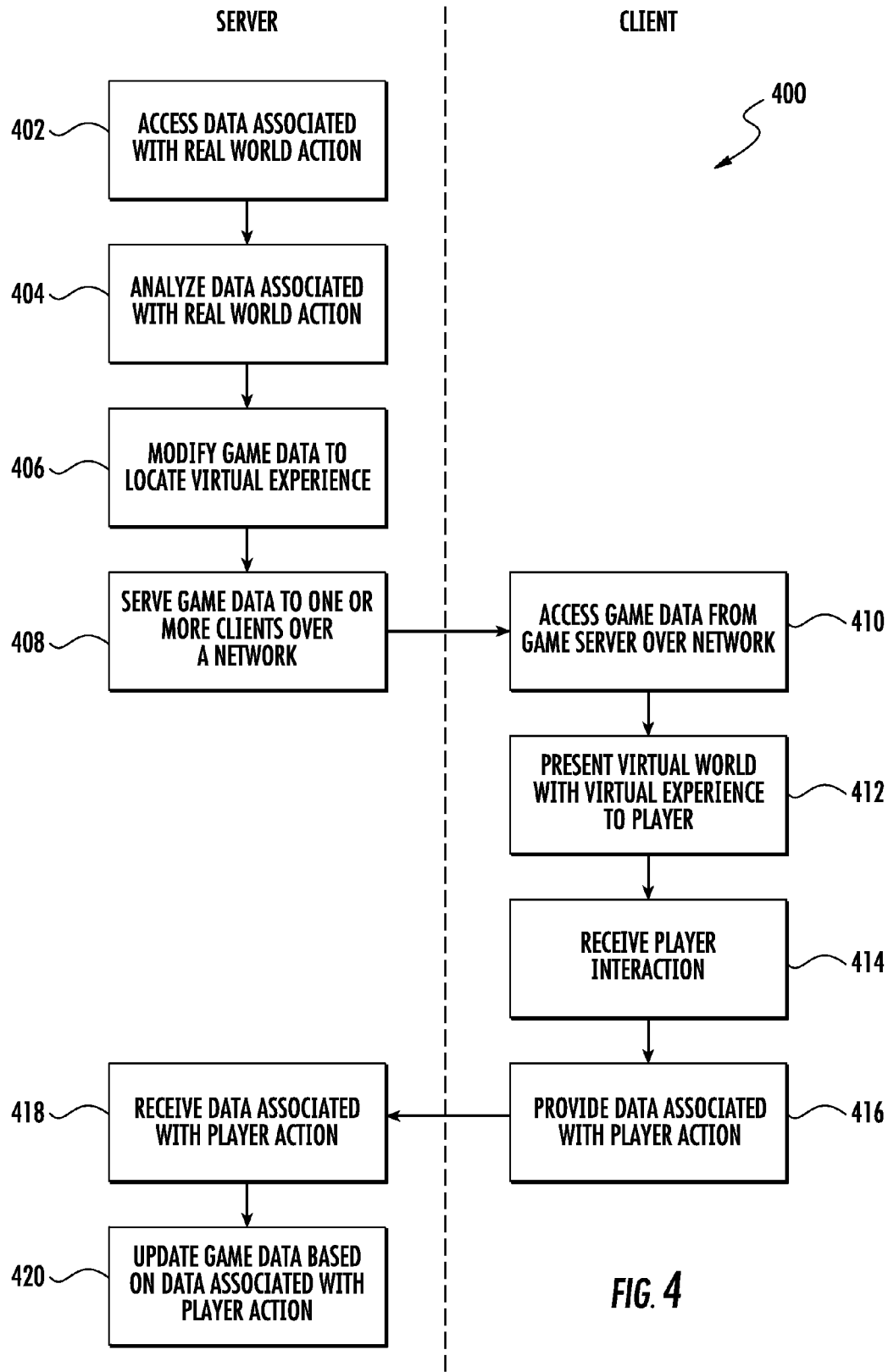
FIG. 4 depicts an exemplary client-server flow diagram of an exemplary method according to an exemplary embodiment of the present disclosure.

Exemplary Client-Server Flow Diagram for Mapping Real World Actions to a Virtual World FIG. 4 depicts an exemplary client-server flow diagram of an exemplary method (400) for mapping real world actions to a virtual world of a parallel reality game according to an exemplary embodiment of the present disclosure. The exemplary method (400) can be implemented using any suitable client-server architecture, such as the location-based gaming system 100 of FIG. 1. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (402), the game server 110 accesses data associated with one or more real world actions. For instance, the locator module 114 implemented by game server 110 can access data associated with one or more real world actions stored in the game database 115 and/or the real world action database 117. Alternatively, the locator module 114 can access one or more different data sources providing real world action data, such as a third party data service or other data source. Exemplary data associated with one or more real world actions accessed by the game server 110 can include current and past locations (singularly or in aggregate) of individuals (e.g. players) in the real world; local time data; local data providing locations of cultural value, recreational value, commercial value, or other value; map data; hazard data; weather data; event calendar data; and other suitable data.

At (404), the game server 110 analyzes the data associated with the one or more real world actions to generate one or more experiences in the virtual world based on the data associated with the one or more real world actions. For instance, the locator module 114 can analyze the data associated with the real world action to identify or determine virtual experiences in the virtual world based on the data associated with the one or more real world actions. The locator module 114 can determine virtual experiences that include any type of virtual element used in the parallel reality game, such as a virtual object, virtual item, virtual energy, or other virtual element that forms a part of the parallel reality game. Exemplary experiences in the virtual world will be discussed in detail below.

At (406), the game server 110 can modify game data stored in, for instance, the game database 115 and/or served to clients 120 over the network 130 to locate one or more virtual experiences based on the data associated with real world actions. For instance, the locator module 114 can create or add one or more virtual experiences associated with virtual elements to the game database 115 and associate virtual coordinate information with the data objects. The virtual coordinate information can specify the virtual coordinates of the determined location of the virtual experiences such that virtual elements are located in the virtual world and are associated with real world actions. In addition to creating or adding data objects to the game database 115, existing data objects stored in the game database 115 can be modified. For instance, virtual coordinate information associated with existing data objects can be adjusted to locate existing virtual elements as part of a virtual experience at coordinates in the virtual world determined based on real world actions.

At (408), the game server 110 serves game data associated with the parallel reality game to one or more clients 120 over the network 130. For instance, the game server 110 can send files encoded with game data to a plurality of clients 120 over the network 130. As set forth above, the game data can include data associated with virtual experiences located in the virtual world according to any of the techniques disclosed herein based on data associated with real world actions At (410), a client 120 accesses the game data served by the game server 110. For instance, the client 120 can send a request for game data and receive game data encoded in one or more data files from the game server 110. The client 120 then presents the virtual world of the parallel reality game to the player (412). For instance, the client 120 displays a representation of the virtual world to the user on a display screen associated with the client. The virtual world can include virtual experiences at locations determined based at least in part on data associated with real world actions. Other suitable interfaces can be provided to present the virtual world to a player, such as audio, vibratory, or other interfaces so that a player can interact with the virtual world without having to look at a display screen of the client device 120.

At (414), the client 120 receives data indicative of real world actions in the parallel reality game, such as data indicative of one or more player actions or player movement. Data indicative of player movement can be the location of the player in the real world determined by positioning device 128. At (416), the client 120 provides the data indicative of the player actions to the game server 110. The game server receives the data (418) and updates the game data for the parallel reality game based on the received data (420).

Exemplary Virtual Experiences Based on Real World Actions

Exemplary virtual experiences can be generated, for instance by a locator module 114 associated with the game server 110, based on data associated with real world actions will now be set forth. The experiences set forth herein are provided for purposes of illustration and discussion. Those of ordinary skill in the art, using the disclosures provided herein, should understand that the subject matter of the present disclosure extends to any suitable process or method for generation of virtual experiences in a virtual world based on data associated with real world actions.

In one embodiment, the data associated with real world actions can include actions associated with locations of cultural, recreational, or commercial value in the real world. Virtual experiences in the virtual world can enhance an experience in the virtual world, the real world, or both, based upon such real world actions. For instance, the data associated with real world actions can include data associated with locations, in the real world, of public artwork, historical markers, tourist attractions, scenic vistas, libraries, hiking trails, museums, universities, arenas, parks, and/or other locations. The locator module 114 can analyze the data and determine a virtual experience at a location in the virtual world corresponding to the actions associated with locations of cultural, recreation, or commercial value in the real world. For instance, a user located in the real world near a museum can be provided an opportunity by the virtual game to receive a virtual museum ticket in the virtual world, wherein the virtual museum ticket can be redeemed in the real world for admission to the museum. In this way, virtual experience in the virtual world can encourage players to travel to the locations of cultural, recreational, or commercial value in the real world in order to interact with such virtual experiences.

In yet another embodiment of the present disclosure, the data associated with the real world actions can include hazard data. The locator module 114 can analyze the data and determine a virtual experience in the virtual world based on the hazard data.

In still another embodiment of the present disclosure, the data associated with real world action can include weather data, including natural disaster data, sunspot data, or the like. The locator module 114 can analyze the data and determine a virtual experience in the virtual world based on the weather data. For instance, the locator module 114 can determine to provide a virtual experience through damage to the virtual world in when an earthquake occurs in the real world. The virtual damage can be limited to virtual areas associated with the real world area in which the earthquake (or other weather event) occurred, or can affect a wider area of the virtual world.

In still another embodiment of the present disclosure, the data associated with real world actions can include event calendar data, including local time of day, or other data that provides, for instance, sporting events, parades, conferences, and/or other events that will draw crowds. The locator module 114 can analyze the data and determine virtual experiences which are associated with, for instance, local time of day, sporting events, parades, conferences, and/or other events that will draw large crowds. For example, real world action of the time of day being night time can make generate a virtual experience of virtual items being harder to locate.

Other exemplary applications of data associated with real world actions can include two or more users working together in the real world to achieve one or more goals in the virtual world as a virtual experience. A prerequisite to a virtual experience in the virtual world can be two or more users assembling at a particular location in the real world. When the two or more users assemble at a particular location in the real world, the game server can generate a virtual experience in the virtual world. For example, two or more users arriving at a common location can generate a virtual experience of a game that the users can engage in with one another, either in the virtual world, in the real world, or some combination thereof.

Still other exemplary applications of data associated with real world actions can include a first user and second user that travel to a real world location to exchange virtual elements in a virtual world between one another. A first user can travel to a real world location and leave a virtual element in the virtual world for the second user. The second user can then travel to the location in the real world to collect the virtual element in the virtual world. Such virtual element can be "locked" some as to only enable certain other users to "unlock" the virtual experience and virtual element. For example, a first user can leave a virtual passport at a real world airport for a second user. The second user can collect the virtual passport by traveling to the airport, which will then allow the second user to travel in the virtual world to another location that would otherwise be inaccessible. However, a third user can be prevented from accessing the virtual passport if, for example, the third user is not a part of the same team or group as the first user.

As mentioned herein, all such virtual experiences can be directly and/or indirectly related to the real world action. For example, real world weather can cause a direct effect on virtual weather (i.e., heavy rains can cause flooding in the virtual world) or, can cause an indirect effect on virtual conditions (i.e., drought can cause prices to increase for produce due to limitation of harvest).

Finally, as discussed previously, two or more actions as described herein can be combined to result in one or more virtual experiences. Virtual experiences in the nature of two or more virtual elements can be distributed throughout the virtual world and require two or more users to engage in real world actions of visiting one or more real world locations to collect such virtual elements. Once users have collected all of the virtual elements, the game server can provide a virtual experience when the users assemble together at a real world location. In alternative implementations, a user can provide their respective virtual element to a different user that then assembles together with the other users at a real world location. For example, a first user can travel to a first real world location to collect a first virtual element. A second user can travel to a second real world location to collect a second virtual element. The first user and the second user can meet at a third real world location and present first virtual element and second virtual element at which time a virtual experience is provided in which the first user and the second user both collect a third virtual element. However, if first user is unable to travel to third real world location, first user can give first virtual element to a third user that can act as first user's proxy to meet with second user at third real world location to receive third virtual element.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of mapping real world actions to a virtual world associated with a parallel reality game, the virtual world having experiences that are impacted by real world actions, the method comprising:
    accessing, by a computer system, game data associated with a parallel reality game, the game data providing a virtual world that is different from real world and parallels at least a portion of the real world, wherein the parallel reality game is configured to allow one or more players to navigate a range of coordinates defining a virtual space in the virtual world by navigating a range of geographic coordinates in the real world;
    identifying, by the computer system, data associated with a real world action comprising a natural disaster occurring at a first area in the real world;
    determining, by the computer system, a second area in the virtual world corresponding to the first area based on location data stored in a game database;
    determining, by the computer system, a virtual element included within the second area in the virtual world based on virtual element data stored in the game database;
    modifying, by the computer system, the game data associated with the parallel reality game to damage the virtual element included within the second area in the virtual world; and
    transmitting, by the computer system to a client device via a computer network, the modified game data to present to a player on the client device the damaged virtual element within the second area in the virtual world.

2. A non-transitory computer-readable medium storing computer-readable instructions, which when executed by one or more processors cause the one or more processors to perform operations comprising:
    accessing game data associated with a parallel reality game, the game data providing a virtual world that is different from real world and parallels at least a portion of the real world, wherein the parallel reality game is configured to allow one or more players to navigate a range of coordinates defining a virtual space in the virtual world by navigating a range of geographic coordinates in the real world;
    identifying data associated with a real world action comprising a natural disaster occurring at a first area in the real world;
    determining a second area in the virtual world corresponding to the first area based on location data stored in a game database;
    determining a virtual element included within the second area in the virtual world based on virtual element data stored in the game database;
    modifying the game data associated with the parallel reality game to damage the virtual element included within the second area in the virtual world; and
    transmitting, to a client device via a computer network, the modified game data to present to a player on the client device the damaged virtual element within the second area in the virtual world.

3. The computer-implemented method of claim 1, further comprising:
    identifying data associated with an additional real world action comprising weather occurring in the real world.

4. The computer-implemented method of claim 3, wherein the virtual world is modified, based on the data associated with the additional real world action, to include virtual weather corresponding to the weather occurring in the real world.

5. The computer-implemented method of claim 1, wherein the virtual world is modified to make an additional virtual element more challenging to locate in the virtual world based on the natural disaster.

6. The computer-implemented method of claim 1, wherein the natural disaster is an earthquake.

7. The computer-readable medium of claim 2, wherein the virtual world is modified to make an additional virtual element more challenging to locate in the virtual world based on the natural disaster.

8. The computer-readable medium of claim 2, wherein the natural disaster is an earthquake.

* * * * *